United States Patent
MacDougall

(10) Patent No.: US 7,583,371 B2
(45) Date of Patent: Sep. 1, 2009

(54) COMBINED BRAGG GRATING WAVELENGTH INTERROGATOR AND BRILLOUIN BACKSCATTERING MEASURING INSTRUMENT

(75) Inventor: Trevor MacDougall, Simsbury, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 11/695,862

(22) Filed: Apr. 3, 2007

(65) Prior Publication Data

US 2007/0242262 A1 Oct. 18, 2007

Related U.S. Application Data

(63) Continuation of application No. 10/696,766, filed on Oct. 29, 2003, now Pat. No. 7,199,869.

(51) Int. Cl.
*G01N 21/88* (2006.01)
(52) U.S. Cl. .................................. 356/73.1
(58) Field of Classification Search ............... 356/73.1; 250/227.11–227.16, 577
See application file for complete search history.

(56) References Cited

U.S. PATENT DOCUMENTS

2002/0109831 A1 * 8/2002 Van Nguyen et al. ...... 356/73.1

2003/0236626 A1 * 12/2003 Schroeder et al. .............. 702/6

FOREIGN PATENT DOCUMENTS

CA 2490107 A1 12/2003

OTHER PUBLICATIONS

Canadian examination report dated Feb. 20, 2009.
Maughan et al., "A Calibrated 27-km Distributed Fiber Temperature Sensor Based on Microwave Heterodyne Detection of Spontaneous Brillouin Backscattered Power," IEEE Photonics Technology Letters, May 2001 vol. 13(5): pp. 511-513.

* cited by examiner

*Primary Examiner*—Tarifur Chowdhury
*Assistant Examiner*—Tara S Pajoohi
(74) *Attorney, Agent, or Firm*—Patterson & Sheridan, LLP

(57) ABSTRACT

A method and apparatus sense attributes of reflected signals in an optical sensing system. In one embodiment, a method for sensing in an optical sensing system comprising an interrogator coupled to a Bragg grating sensor by an optical cable includes the steps of producing a first optical signal, coupling the first optical signal to an optical cable, receiving a first reflected signal from a Bragg grating sensor within the optical cable, resolving a wavelength of first reflected signal, producing a second optical signal, coupling the second optical signal to the optical cable, receiving a second reflected signal caused by Brillouin backscattering within the optical cable, and resolving a difference in frequencies between the second optical signal and second reflected signal. Embodiments of the method and apparatus are particularly useful for sensing temperature and strain in hazardous locations such as down hole gas and oil field applications and the like.

13 Claims, 6 Drawing Sheets

COMBINED BRAGG GRATING WAVELENGTH INTERROGATOR AND BRILLOUIN BACKSCATTERING MEASURING INSTRUMENT

CROSS-REFERENCE TO RELATED APPLICATIONS

This application is a continuation of U.S. patent application Ser. No. 10/696,766 filed Oct. 29, 2003, now U.S. Pat. No. 7,199,869, which is herein incorporated by reference.

BACKGROUND OF THE INVENTION

1. Field of the Invention

Embodiments of the invention generally relate to a method and apparatus for detecting changes in a reflective signal in a fiber optic sensing system.

2. Background of the Related Art

For fiber optic sensing systems, specifically Bragg grating-based systems, a dedicated opto-electronic instrument is required to measure environmentally-induced changes in peak wavelengths. If additional measurements, such as Brillouin-based temperature and/or strain measurements are needed, additional dedicated opto-electronic instrumentation is required. Systems having dedicated instruments for sensing both Bragg grating and Brillouin based measurements can be extremely costly and complex.

Therefore, there is a need for an improved fiber optic sensing system.

SUMMARY OF THE INVENTION

A method and apparatus for sensing using an optical fiber are provided. In one embodiment, a method for sensing an attribute (such as wavelength and/or frequency) of a reflected signal in an optical fiber sensing system comprising an interrogator coupled to a Bragg grating sensor by an optical cable includes the steps of producing a first optical signal, coupling the first optical signal to an optical cable, receiving a first reflected signal from a Bragg grating sensor within the optical cable, resolving a wavelength spectrum difference between the first optical signal and first reflected signal, producing a second optical signal, coupling the second optical signal to the optical cable, receiving a second reflected signal caused by Brillouin backscattering within the optical cable, and resolving a shift in wavelength spectrum between the second optical signal and second reflected signal.

In another embodiment, an apparatus for sensing an attribute in returning optical signals includes a Bragg grating sensor coupled by an optical fiber to a light source and signal detection circuit. The light source is suitable for producing optical signals tunable over a range of wavelengths and is adapted to generate a signal having sufficient intensity to produce Brillouin scattering of the signal while propagating in the optical fiber. The signal detection circuit includes a first sensing branch for detecting an attribute of a signal reflected from the Bragg grating, a second sensing branch for sensing an attribute of back-scattered signals and an optical switch for diverting signals returning from the optical fiber to the optical signal detection circuit selectively between the first and second branches. Embodiments of the method and apparatus are particularly useful for sensing temperature and strain in hazardous locations such as down hole gas and oil field applications and the like.

BRIEF DESCRIPTION OF THE DRAWINGS

A more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments. So that the manner in which the above-recited embodiments of the invention are obtained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are, therefore, not to be considered limiting of its scope, for the invention may admit to other equally effective embodiments.

To facilitate understanding, identical reference numerals have been used, wherever possible, to designate identical elements that are common to the figures.

DETAILED DESCRIPTION

Figure 1:
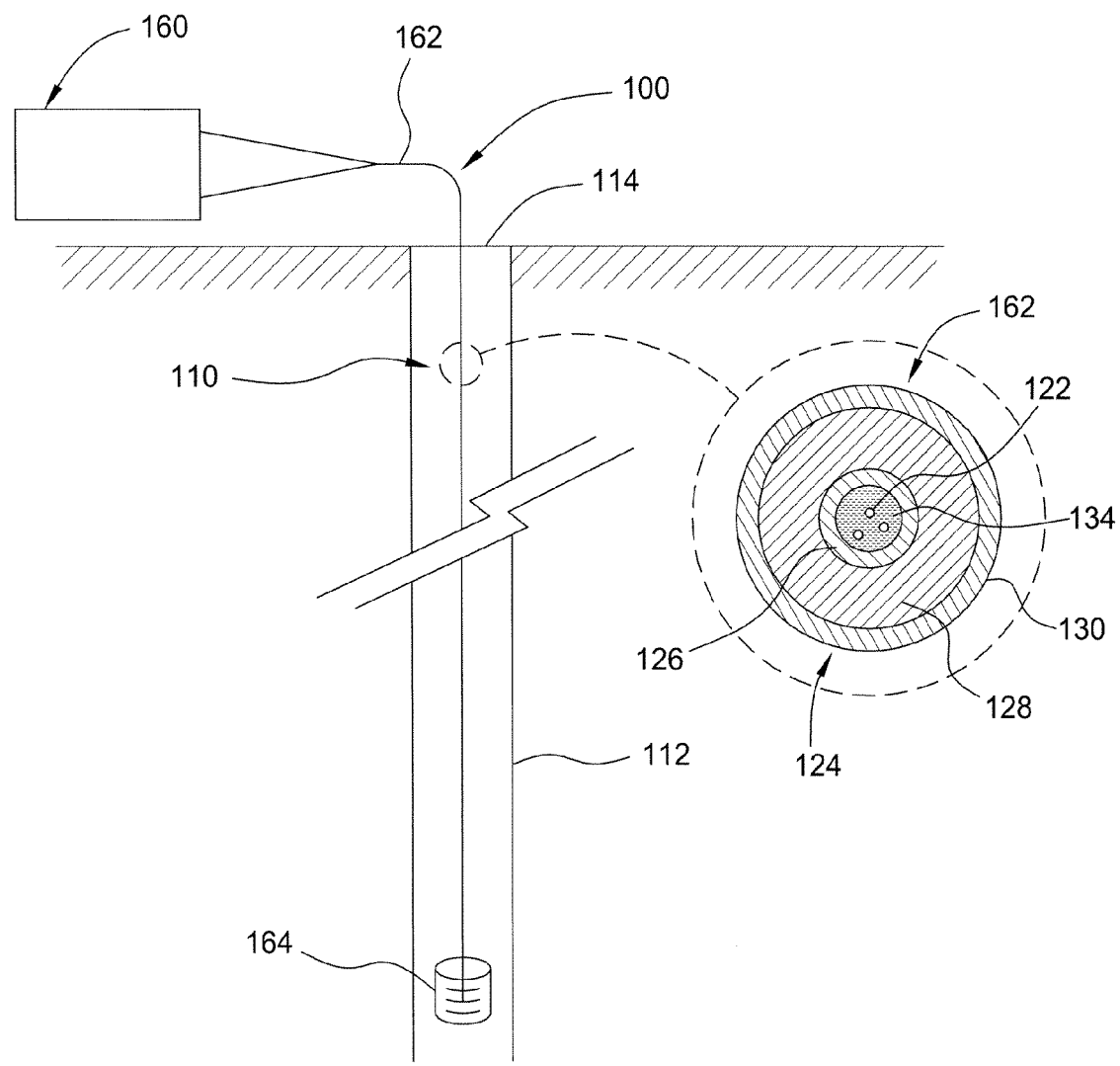
FIG. 1 is a system-level view of a fiber optic sensing system suitable for use in oil or gas well applications.

FIG. 1 is a simplified schematic of an oil or gas well 110 having an optical fiber sensing system 100 adapted to sense environmental conditions within the well 110 using a method and apparatus of the present invention. The well 110 includes a main bore 112 extending from a wellhead 114. The sensing system 100 utilizes both Bragg grating reflections and non-linear induced back scatter signals to resolve environmental conditions along the sensing path. In one embodiment, wavelengths and/or frequency of reflected signals are indicative of temperature and strain information of the environmental conditions within the well 110.

The sensing system 100 includes an interrogator 160 coupled by an optic cable 162 to at least one sensor 164. The sensor 164 may be a single point sensor or other suitable Bragg grating sensor. One sensor 164 that may be utilized is available from Weatherford, Inc., located in Houston, Tex. Another example of a sensor 164 that may be utilized is described in U.S. Pat. No. 6,422,084, entitled "Bragg Grating Pressure Sensor", issued Jul. 23, 2002 to Fernald et al.; and U.S. Pat. No. 6,452,667, entitled "Pressure Isolated Bragg Grating Temperature Sensor", issued Sep. 17, 2002, to Fernald et al., all of which are hereby incorporated by reference in their entireties.

Figure 2:
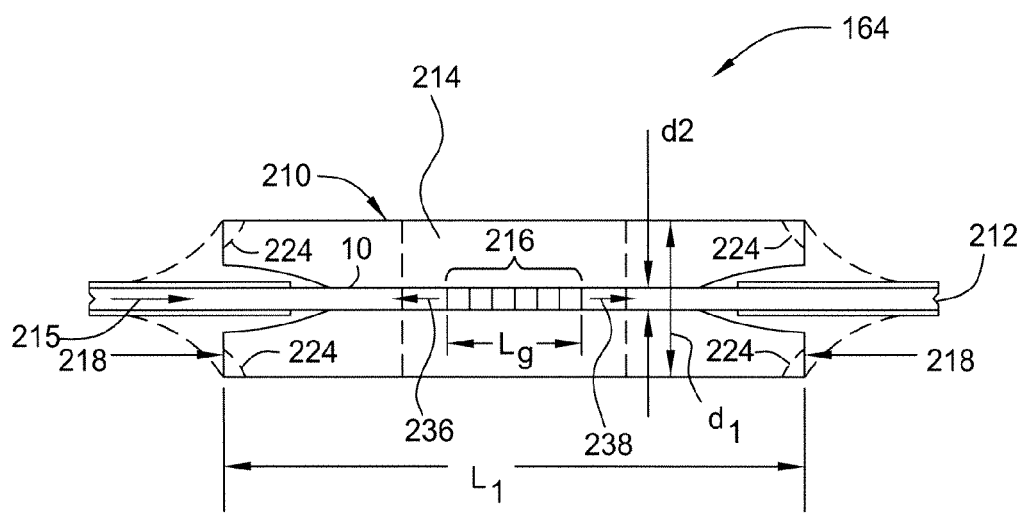
FIG. 2 is one embodiment of a sensor of the system of FIG. 1.

FIG. 2 depicts one embodiment of the sensor 164. The sensor 164 includes a large diameter optical waveguide 210, has at least one core 212 surrounded by a cladding 214, similar to that disclosed in U.S. Pat. No. 6,363,089 entitled "Large Diameter Optical Waveguide, Grating, and Laser", which is incorporated herein by reference. The waveguide 210 comprises silica glass ($SiO_2$) based material having the appropriate dopants, as is known, to allow light 215 to propagate in either direction along the core 212 and/or within the waveguide 210. The core 212 has an outer dimension d1 and the waveguide 210 has an outer dimension d2. Other materials for the optical waveguide 210 may be used if desired. For example, the waveguide 210 may be made of any glass, e.g., silica, phosphate glass, or other glasses; or solely plastic.

In one embodiment, the outer dimension d2 of the cladding 214 is at least about 0.3 mm and outer dimension d1 of the core 212 such that it propagates only a few spatial modes (e.g., less than about 6). For example for single spatial mode propagation, the core 212 has a substantially circular transverse cross-sectional shape with a diameter d1 less than about 12.5 microns, depending on the wavelength of light. The invention will also work with larger or non-circular cores that propagate a few (less than about 6) spatial modes, in one or more transverse directions. The outer diameter d2 of the cladding 214 and the length L have values that will resist buckling when the waveguide 210 is placed in axial compression as indicated by the arrows 218.

The waveguide 210 may be ground or etched to provide tapered (or beveled or angled) outer corners or edges 224 (shown in phantom) to provide a seat for the waveguide 210 to mate with another part (not shown) and/or to adjust the force angles on the waveguide 210, or for other reasons. The angle of the beveled corners 224 is set to achieve the desired function. Further, the waveguide may be etched or ground to provide nubs for an attachment of a pigtail assembly to the waveguide. Further, the size of the waveguide 210 has inherent mechanical rigidity that improves packaging options and reduces bend losses.

The waveguide has a Bragg grating 216 impressed (or embedded or imprinted) therein. The Bragg grating 216, as is known, is a periodic or aperiodic variation in the effective refractive index and/or effective optical absorption coefficient of an optical waveguide. The grating 216 may be in the core 212 and/or in the cladding 214 (shown in the core 212 in FIG. 2). Any wavelength-tunable grating or reflective element embedded, etched, imprinted, or otherwise formed in the waveguide 210 may be used if desired. The waveguide 210 may be photosensitive if a grating 216 are to be written into the waveguide 210. As used herein, the term "grating" means any of such reflective elements. Further, the reflective element (or grating) 16 may be used in reflection and/or transmission of light. Light 215 incident on the grating 216 reflects a portion thereof as indicated by a line 236 having a predetermined wavelength band of light, and passes the remaining wavelengths of the incident light 215 (within a predetermined wavelength range), as indicated by a line 238 (as is known).

The grating 216 has a grating length Lg, which is determined based on the application, may be any desired length. A typical grating 216 has a grating length Lg in the range of about 3-40 mm. Other sizes or ranges may be used if desired. The length Lg of the grating 216 may be shorter than or substantially the same length as the length L of the waveguide 210. Also, the core 212 need not be located in the center of the waveguide 210 but may be located anywhere in the waveguide 210.

Accordingly, we have found that the present invention also reduces coupling between the core and cladding modes due to the increased end cross-sectional area between the core and cladding of the waveguide. Thus, a grating 216 written in the core 212 of the waveguide 210 exhibits less optical transmission loss and exhibits a cleaner optical profile than a conventional fiber grating because the large cladding region dissipates coupled cladding modes, thereby reducing the coupling of the core 212 to the cladding 214 modes. In general, the greater the difference in cross-sectional area between the core 212 and the cladding 214 the smaller the mode field overlap and the lower the coupling to the cladding modes. The thickness of the cladding 214 between the cladding outer diameter and the core outer diameter may be set to optimize this effect. Other diameters of the core 212 and waveguide 210 may be used if desired such that the cladding modes are reduced to the desired levels.

The waveguide 210 may have end cross-sectional shapes other than circular, such as square, rectangular, elliptical, clam-shell, octagonal, multi-sided, or any other desired shapes, discussed more hereinafter. Also, the waveguide may resemble a short "block" type or a longer "cane" type geometry, depending on the length of the waveguide and outer dimension of the waveguide.

The side cross-section of the outer surface of the waveguide 210 may have a varying geometry, depending on the application. For example, the waveguide 210 may have a "dogbone" shape having a narrow central section and larger outer sections. The dogbone shape may be used to provide increased sensitivity in converting axial force to length change $\Delta L$ and/or wavelength shift $\Delta \lambda$ of the grating 216 and may be achieved by etching, grinding, machining, heating & stretching, or other known techniques.

The dimensions and geometries for any of the embodiments described herein are merely for illustrative purposes and, as such, any other dimensions may be used if desired, depending on the application, size, performance, manufacturing requirements, or other factors, in view of the teachings herein.

The optical waveguide 210 may be formed by heating, collapsing and fusing a glass capillary tube to a fiber (not shown) by a laser, filament, flame, etc., as is described U.S. Pat. No. 6,519,388, entitled "Tube-Encased Fiber Grating," which is incorporated herein by reference. Alternatively, other techniques may be used to fuse the fiber to the tube, such as using a high temperature glass solder, e.g., a silica solder (powder or solid), such that the fiber, the tube and the solder all become fused to each other, or using laser welding/fusing or other fusing techniques.

The Bragg grating may be written in the fiber before or after the capillary tube is encased around and fused to the fiber, such as is discussed in the above referenced U.S. Pat. No. 6,519,388. If the grating is written in the fiber after the tube is encased around the grating, the grating may be written through the tube into the fiber by any desired technique, such as is described in U.S. Pat. No. 6,298,184, entitled "Method and Apparatus For Forming A Tube-Encased Bragg Grating", filed Dec. 4, 1998, which is incorporated herein by reference.

Returning to FIG. 1, the optic cable 162 generally includes one or more optical fibers suitable for transmitting optic signals between the interrogator 160 and the sensor 164. Examples of suitable optic cables are described in U.S. Pat. No. 6,404,961, issued Jun. 11, 2002 to Bonja et al., and U.S. patent application Ser. No. 10/422,396, filed Apr. 24, 2003 by Dowd et al., both of which are hereby incorporated by reference in their entireties. Suitable cables are also available from Weatherford, Inc.

In the embodiment depicted in FIG. 1, the optic cable 162 includes one or more single-mode optical fibers 122 disposed in a protective sleeve 124 suitable to protect the optical fibers 122 in a down hole well environment. In some applications, the optical cable 162 may extend up to and exceed 12 kilometers through main bore 112 and/or at least one of the secondary bores (not shown) that may branch out from the main bore 112 within the well 110.

In one embodiment, the sleeve 124 includes an inner tube 126 seam welded around the one or more optical fibers 122, a spacer 128 and an outer metal tube 130. The inner tube 126 may be filled with a material 132, for example a getter gel, utilized to support the one or more optical fibers 122 in the inner tube 126. The outer metal tube 130 is welded around the spacer 128 that is disposed between the inner and outer tubes 126, 130. A barrier material (not shown) having low hydrogen permeability may be disposed on at least one of the tubes 126, 130.

The interrogator 160 is configured to transmit and receive optical signals through the optic cable 162. The interrogator 160 is suitable for interrogating both Bragg grating based sensors and non-linear induced backscatter signals to provide a metric indicative of the wavelength and/or frequency of reflected signals that are indicative environmental conditions within the well, for example, temperature and strain. In addition, other environmental conditions may be detected by the optical Bragg grating based sensor such as pressure, seismic disturbances, chemicals, etc., as is well known in the art. It is also contemplated within the scope of present invention that multiple optical Bragg grating based sensors positioned along the cable and multiplexed as is known in the art.

Figure 3:
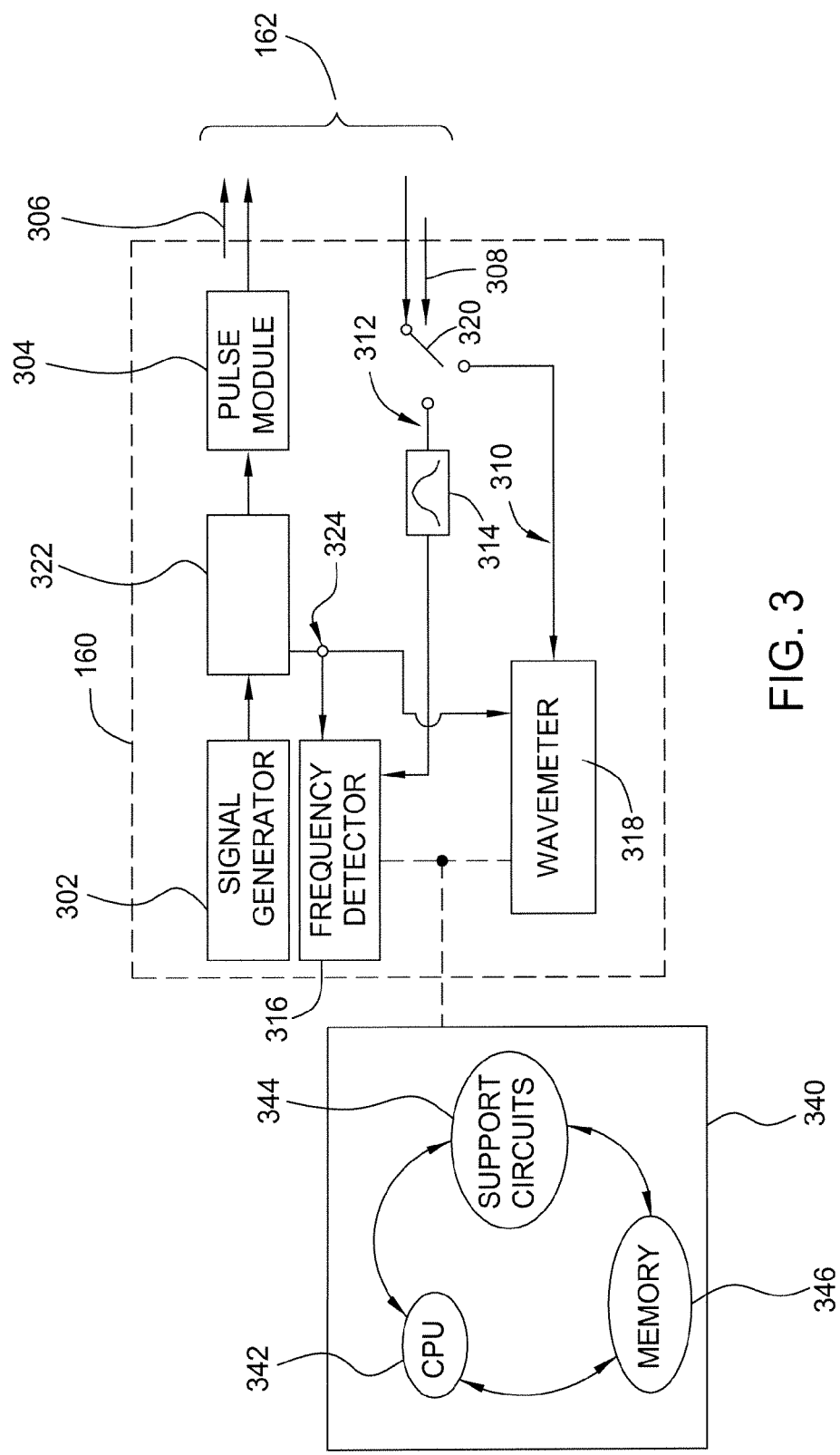
FIG. 3 is a schematic of one embodiment of an interrogator of FIG. 1.

FIG. 3 depicts one embodiment of the interrogator 160. The interrogator 160 includes a signal generator 302, a pulse module 304, a frequency detector 316 and an optical wavemeter 318. A controller 340 is coupled to the interrogator 160 for processing information provided by the frequency detector 316 and the optical wavemeter 318. Alternatively, the controller 340 may be an integral part of the interrogator 160. The controller 340 may also manages signal generation, collection and interpretation of data, and the general operation of the sensing system 100.

The controller 340 includes a central processing unit (CPU) 342, support circuits 344 and memory 346. The CPU 342 may be one of any form of general purpose computer processor that can be used in an industrial setting configured to interface with the interrogator 160. The memory 346 is coupled to the CPU 342. The memory 346, or computer-readable medium, may be one or more of readily available memory such as random access memory (RAM), read only memory (ROM), floppy disk, hard disk, or any other form of digital storage, local or remote. The support circuits 344 are coupled to the CPU 342 for supporting the processor in a conventional manner. These circuits include cache, power supplies, clock circuits, input/output circuitry and subsystems, and the like.

The signal generator 302 is coupled to a first tap 322. The first tap 322 selectively directs portions of an output of the signal generator 302 to the pulse module 304 and the wavemeter 318. The percentage of the signal diverted by the first tap 322 may be selected based on the depth of the sensor 164 within the well, among other factors.

A second tap 324 is disposed between the first tap 322 and the wavemeter 318 to divert a portion of the signal passing therebetween to the frequency detector 316. The pulse module 304 is coupled to the optic cable 162 such that an output signal (shown by arrow 306) from the interrogator 160 may be sent through the cable 162 to the sensor 164 (shown in FIG. 1).

An optical switch 320 is disposed in the interrogator 160 for selectively diverting reflected return signals (shown by arrow 308) between a first return path 310 and a second return path 312. The first return path 310 directs the return signals 306 reflected from the sensor 164 to the wavemeter 318. The second return path 312 directs the Brillouin backscattered return signals 306 to the frequency detector 316.

The signal generator 302 is configured to produce an optical signal into the optical fiber 122. The signal generator 302 may produce a single polarized optical signal and may have an output adjustable in power and of intensity sufficient to produce Brillouin scattering of the signal as the signal propagates through the optical fiber 122 down the well 110. In one embodiment, the intensity of the signal is at least about 100 microwatts. The signal generator 102 is configured to produce an output signal tunable at least between wavelengths reflected and transmissive to the sensor 164 (e.g., not in the sensor band). In one embodiment, the signal generator 302 is a semiconductor laser having an output signal tunable between at least about 3 to about 6 kilometers over the reflected band of the sensor 164. Alternatively, the signal generator 302 may be a broadband light source coupled with a tunable filter.

The pulse module 304 may be set to a first state that allows the output signal of the signal generator to pass directly therethrough. The pulse module 304 may be set to a second state that pulses the output signal through the optical cable 162. The pulse rate is generally selected to allow individual pulses to be reflected without interference from subsequently launched signals.

The second return path 312 may include one or more signal conditioning devices suitable for enhancing the performance of the frequency detector 316 in analyzing Brillouin backscattered return signals. In one embodiment, the conditioning device disposed on the second return path 312 between the switch 320 and the frequency detector 316 is a Rayleigh filter 314. The Rayleigh filter 314 conditions the returning signals and improve system performance by removing extraneous portions of the reflected signal not required for the analysis of the conditions along the sensing path.

The wavemeter 318 is a high resolution wavelength detector and is configured to receive reflected signals returning through the optical fiber 122 of the cable 162 and launched signals tapped from the signal generator 302. The wavemeter 318 is also configured to determine the amplitude of the optical signals. The wavemeter 318 may include one or more photodiodes for converting the optical signal to a digital signal. The wavemeter 318 provides the controller 340 with a metric indicative of the wavelength (and/or frequency) of the launched and reflected signals.

The frequency detector 316 is a high resolution frequency detector and is configured to receive backscattered signals returning through the optical fiber 122 of the cable 162 and launched signals tapped from the signal generator 302. The frequency detector 316 resolves a difference in frequency between the launched and reflected signals. A metric indicative of the difference in frequency is provided to the controller 340 which is indicative of environmental conditions at the portion of the fiber from which the backscattered signal was reflected.

Figure 4A:
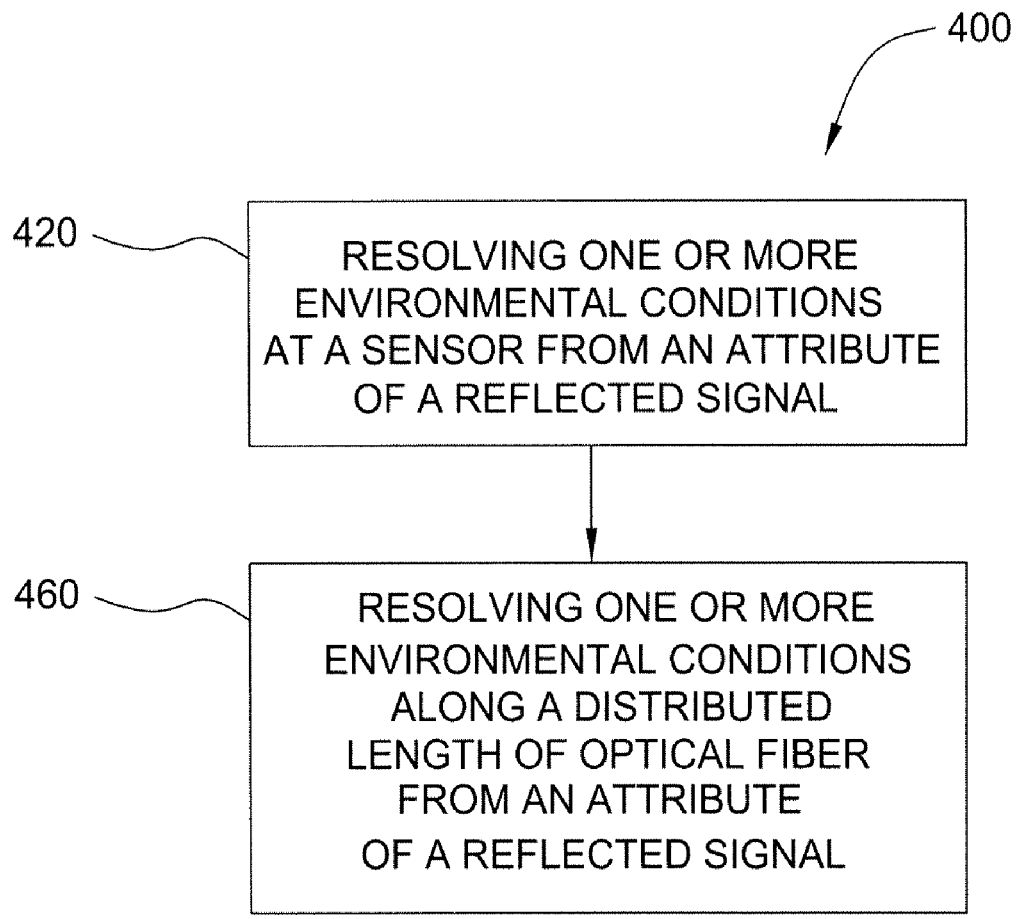
FIGS. 4A-C are a flow diagram of one embodiment of a method for sensing wavelength shifts in returning optical signals.
Figure 4B:
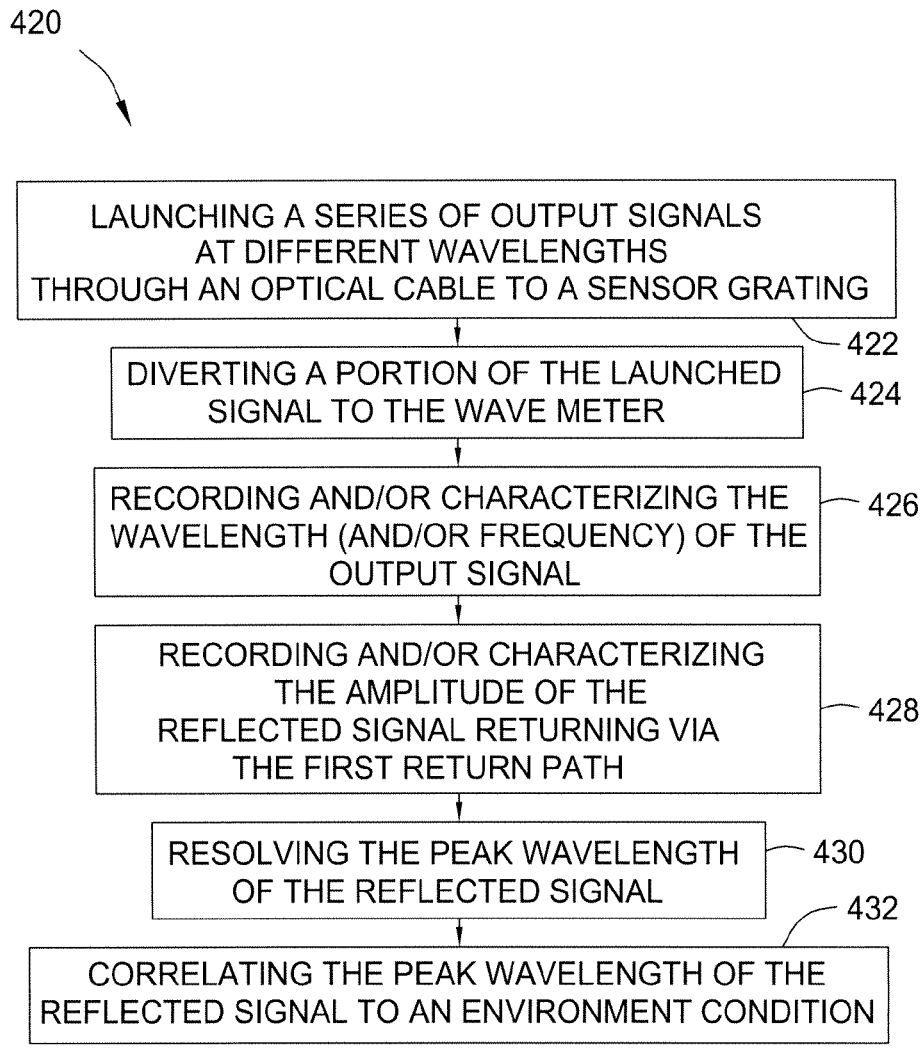
Figure 4C:
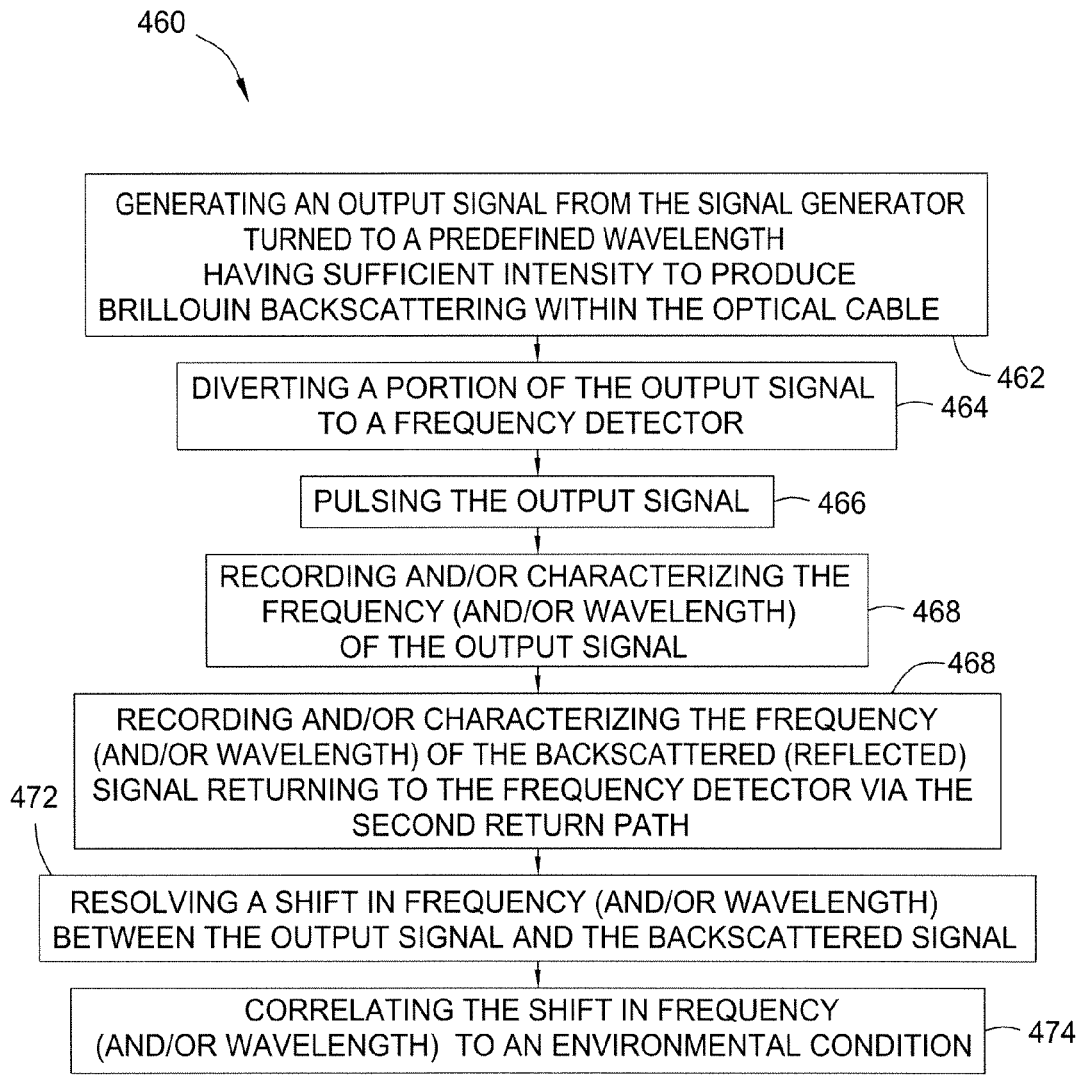

A sensing method 400, described below with reference to the flow diagrams illustrated in FIGS. 4A-C, is generally stored in the memory 346 of the controller 340, typically as a software routine. The software routine may also be stored and/or executed by a second CPU (not shown) that is remotely located from the hardware being controlled by the CPU 342. When the routine is executed by the CPU 342, the controller 340 provides instructions to the signal generator 302 and receives data from the frequency detector 316 and wavemeter 318, from which an attribute, such as wavelength and/or frequency of returning optical signals may be resolved. In one mode of operation, the resolved attributes may be indicative of temperature and/or strain at one or more predefined positions along the optical fiber 122 that corresponds depth and/or location within the well 110.

FIGS. 4A-C are flow diagrams of one embodiment of the method 400 for resolving a measure of one or more environmental conditions from attributes of returning optical signals. The method 400 begins by performing a point sensing step 420 and may be followed by a distributed sensing step 460. The point sensing step 420 is mainly utilized to resolve a measure of one or more environmental conditions at the sensor 164.

The point sensing step 420 begins at step 422 by producing a series of output signals 306 from the signal generator 302 through a band of wavelengths from the interrogator 160 to the sensor 164. In one embodiment, the output signals 306 may be produced by scanning a laser through a predefined range of output wavelengths.

At step 424, the tap 322 selectively diverts a portion of the signal 306 produced by the interrogator 160 to the wavemeter 318 through the tap 324. At step 426, the wavemeter 318 records and/or characterizes the amplitude versus time of the reflected signal 308 returning via the first return path 310. At step 330, a peak wavelength of the reflected signal is resolved by determining the time corresponding to the peak amplitude of the reflected signal, from which the wavelength may be derived using the time/wavelength relationship characterized from the launched signal. At step 432, the wavelength information of the reflected signal 308 is correlated to environmental parameters (for example, strain and/or temperature) at the sensor 164.

The distributed sensing step 460 begins at step 462 where the signal generator 302 produces a signal tuned to a wavelength not in the band of the grating (e.g., sensor 164). The signal generally has sufficient power to induce Brillouin scattering as the signal propagates through the optical cable 162. At step 464, the taps 322, 324 selectively diverts a portion of the produced signal 306 to the frequency detector 316. At step 466, the remainder of the signal (e.g., the portion not diverted at step 464) is pulsed by the pulse module 304. The pulse module 304 is set to pulse the output signal 306 traveling down the optic cable 162 toward the sensor 164.

At step 468, the frequency detector 316 records and/or characterizes the frequency (and/or wavelength) of the output signal 306. At step 470, the frequency detector 3126 records and/or characterizes the frequency (and/or wavelength) of the backscattered (reflected) signal 308 returning to the frequency detector 316 via the second return path 320. At step 372, a shift in difference in the frequencies (and/or wavelengths) between the output signal 306 and the backscattered signal 308 is resolved which indicates a change in the environmental parameters along the distributed length of the optical cable 162. The shift in the backscattered signal 308 is indicative of changes in environmental conditions along the sensing string (e.g., the length of the optical cable 162). Analysis of the change in wavelength of the backscattered signal 308 can be resolved, for example, by the controller 340, to provide distributed strain and temperature information over the length of the optical cable 162, which corresponds to distinct locations along the main bore 112 of the well 110.

Thus, a method and apparatus has been presented for accurately sensing the attributes in both Bragg grating and Brillouin backscattered optical signals. The invention advantageously minimizes the amount of measurement equipment required to sense both types of reflected signals, thereby reducing the cost of and complexity of measurement equipment. The invention is particularly suitable for use in hazardous locations, such as oil and gas well applications, where changes in signal wavelengths are indicative of environmental changes within the well, such as changes in temperature and strain.

Although several embodiments which incorporate the teachings of the present invention have been shown and described in detail, those skilled in the art can readily devise many other varied embodiments that still incorporate these teachings.

What is claimed is:

1. An apparatus for sensing reflected optical signals, comprising:
    a Bragg grating sensor, wherein the Bragg grating sensor comprises a large diameter optical waveguide having at least one core surrounded by a cladding, wherein the cladding has an outer dimension of at least 0.3 mm;
    an optical fiber coupled to the sensor; and
    an interrogator coupled to the optical fiber and configured to transmit and receive optical signals, wherein the received signals are reflected from the Bragg grating sensor and backscattered along a portion of the optical fiber, the received signals being indicative of environmental conditions at the Bragg grating sensor and along the portion of the optical fiber, wherein the interrogator is configured to distinguish between the received signals reflected from the Bragg grating sensor and the received signals backscattered along the portion of the optical fiber, and wherein the interrogator is configured to operate an optical switch for diverting the received signals reflected from the Bragg grating sensor to a first return path and the received signals backscattered along the portion of the optical fiber to a second return path.

2. The apparatus of claim 1, wherein the Bragg grating sensor comprises an optical fiber.

3. The apparatus of claim 1, wherein the interrogator comprises a tunable laser.

4. The apparatus of claim 1, wherein the interrogator comprises a broadband light source coupled to a tunable filter.

5. The apparatus of claim 1, wherein the interrogator comprises a pulse module configured to output the transmitted optical signals as optical pulses.

6. The apparatus of claim 1, wherein the first return path is coupled to a wavemeter.

7. The apparatus of claim 1, wherein the second return path is coupled to a frequency detector.

8. The apparatus of claim 1, wherein the second return path comprises at least one signal conditioning device.

9. The apparatus of claim 8, wherein the at least one signal conditioning device is a Rayleigh filter.

10. The apparatus of claim 1, further comprising a controller configured to process the received signals and/or control the interrogator.

11. The apparatus of claim 10, wherein the controller is integrated with the interrogator.

12. An apparatus for sensing reflected optical signals, comprising:
    a Bragg grating sensor, wherein the Bragg grating sensor comprises a large diameter optical waveguide having at least one core surrounded by a cladding, wherein the cladding has an outer dimension of at least 0.3 mm;
    an optical fiber coupled to the sensor;
    an interrogator coupled to the optical fiber and configured to transmit and receive optical signals, wherein the received signals are reflected from the Bragg grating sensor and backscattered along a portion of the optical fiber, the received signals being indicative of a first environmental condition at the Bragg grating sensor and a second environmental condition along the portion of the optical fiber, wherein the interrogator is configured to operate an optical switch for diverting the received signals reflected from the Bragg grating sensor to a first return path and the received signals backscattered along the portion of the optical fiber to a second return path, and wherein the interrogator is configured to distinguish between the received signals reflected from the Bragg grating sensor and the received signals backscattered along the portion of the optical fiber; and a controller configured to receive the distinguished received signals from the interrogator and to process a parameter indicative of the first environmental condition from the received signals reflected from the Bragg grating sensor and a parameter indicative of the second environmental condition from the received signals backscattered along the portion of the optical fiber.

13. The apparatus of claim 12, wherein the controller is integrated with the interrogator.

* * * * *